United States Patent [19]

Bowditch et al.

[11] 4,026,156

[45] May 31, 1977

[54] VERTICAL DISPLACEMENT MEASURING APPARATUS

[75] Inventors: Philip N. Bowditch, Cohasset; William E. Toth, Bolton; Arthur Grossman, Framingham, all of Mass.

[73] Assignee: The Charles Stark Draper Laboratory, Inc., Cambridge, Mass.

[22] Filed: Nov. 6, 1975

[21] Appl. No.: 629,640

[52] U.S. Cl. .......................... 73/432 HA; 73/393; 73/401; 33/367; 33/377
[51] Int. Cl.² ................... G01C 5/04; G01C 9/20; G01L 7/18
[58] Field of Search .......... 73/385, 393, 407 PR, 73/432 HA, 296, 299, 433, 438, 401; 33/367, 377

[56] References Cited

UNITED STATES PATENTS

| | | |
|---|---|---|
| 2,423,394 | 7/1947 | Lee .................................. 73/401 X |
| 2,557,021 | 6/1951 | Williams ........................... 33/367 X |
| 2,644,329 | 7/1953 | Redfield .......................... 73/438 X |
| 2,703,985 | 3/1955 | Jackson .......................... 73/432 HA |
| 2,789,364 | 4/1957 | Selleck ............................ 33/377 |
| 3,097,536 | 7/1963 | Young .............................. 73/393 X |
| 3,310,880 | 3/1967 | Watts ................................ 33/367 |
| 3,610,042 | 10/1971 | Brosius, Jr. ..................... 73/393 X |
| 3,611,811 | 10/1971 | Lissau .............................. 73/401 |
| 3,779,084 | 12/1973 | Nilsson .......................... 73/432 HA |
| 3,880,009 | 4/1975 | Johnston ...................... 73/407 R X |

*Primary Examiner*—Richard C. Queisser
*Assistant Examiner*—John S. Appleman
*Attorney, Agent, or Firm*—Kenway & Jenney

[57] ABSTRACT

Apparatus for measuring the vertical displacement between a remote point and a reference point. The apparatus comprises a pair of reservoirs, each having a liquid working fluid disposed therein, a differential pressure transducer and a hydraulic coupling means for each of the reservoirs. Each hydraulic coupling means couples a point in the reservoir below the top surface of the working fluid to an associated input port of the pressure transducer. A vapor pressure equalization means is provided for the reservoirs whereby the points above the top surface of the working fluid in each reservoir are maintained at substantially equal pressures. The apparatus further includes a volumetric temperature compensation means for offsetting temperature dependent changes in the volume of the working fluids which occur in the hydraulic coupling means. The pressure transducer provides an output signal representative of the difference in hydrostatic pressure applied to the input ports of the sensing element associated with the transducer.

9 Claims, 5 Drawing Figures

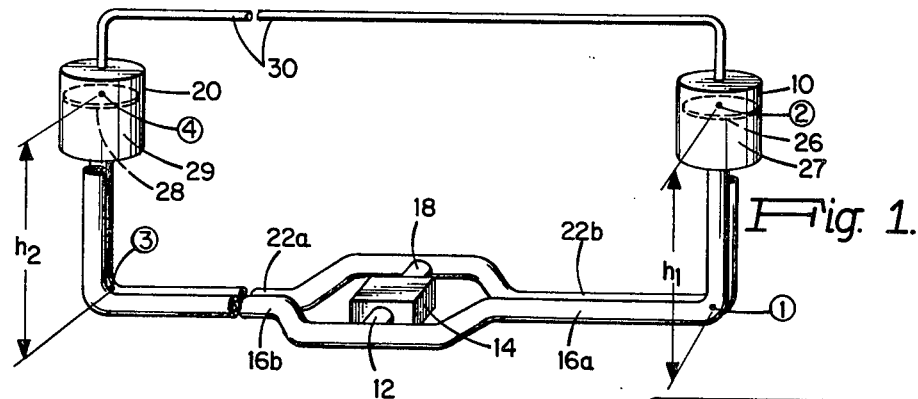
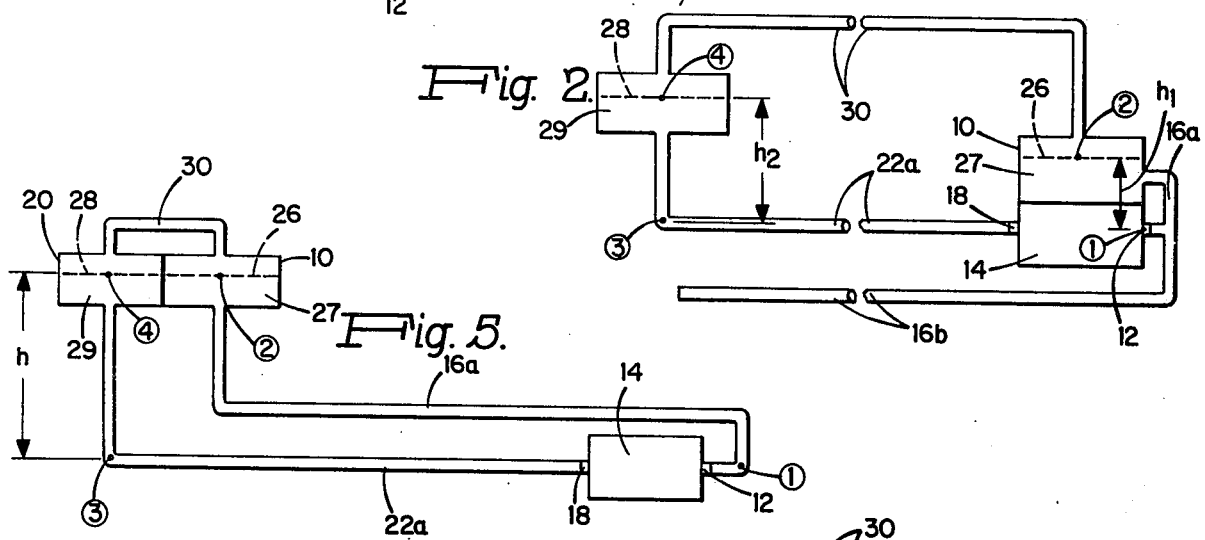
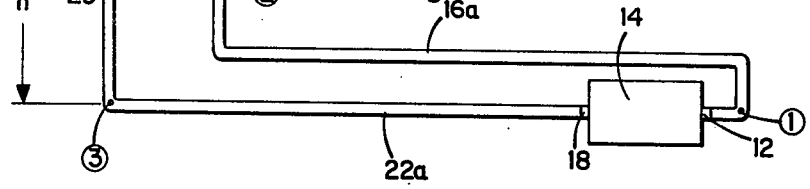
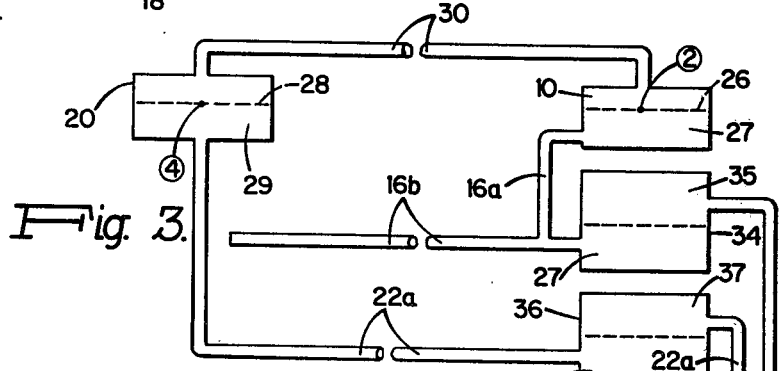
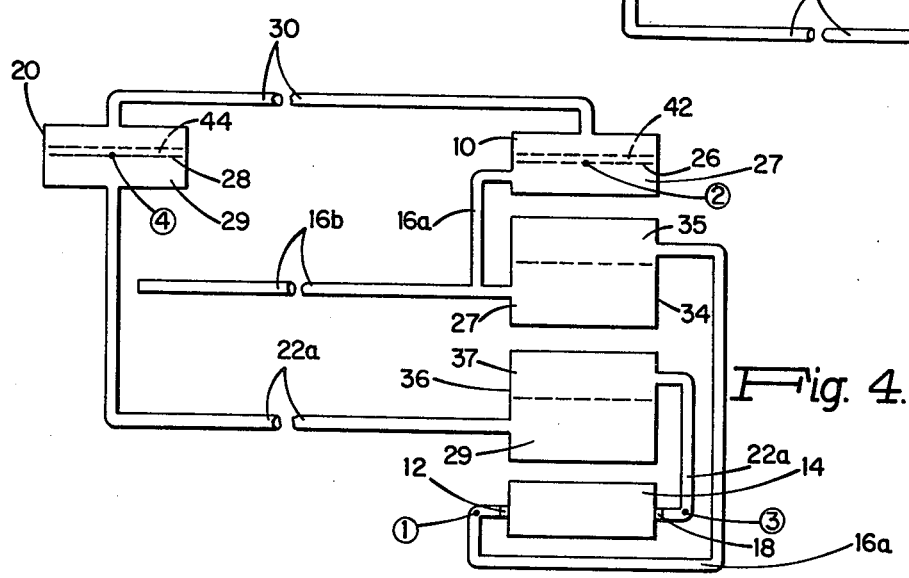

VERTICAL DISPLACEMENT MEASURING APPARATUS

BACKGROUND OF THE INVENTION

This invention relates to instrumentation for measuring the vertical displacement from a reference point.

Instrumentation providing a precise measurement of small vertical displacements of a remote point from a reference point is particularly useful for the static deflection measurement of bridges, buildings and the like. Alternative uses include tunneling navigation, ship construction and soil settlement.

In the prior art, there are three principal classes of instruments for providing such measurements. The first, based on a water-tube, utilizes an elongated u-shaped tube having water or an equivalent fluid therein. Using such an instrument, one end of the tube is positioned with the fluid level therein at local reference point and the other (remote) end is positioned at the desired remote point. A graticule marking on the tube at the remote end may be used in conjunction with the fluid level at that end to provide a measure of the vertical displacement of that remote end of the tube from the local reference point of the reference end of the tube. However, such water tube based instrumentation depends on fluid flow within the tube and is also very sensitive to variations in surface tension of the fluid. Furthermore, dynamic instability and thermal error also contribute significantly to the cumulative error in such instrumentation.

A second class of instruments known in the art utilizes transit survey and other optical techniques. However, this class of instrumentation requires substantial care and set-up time, and further requires an optically transparent medium in order to accommodate the line of sight measurements. Furthermore, such equipment is relatively inaccurate over large distances.

A third class of instrumentation known in the art utilizes stain gauge techniques, and is principally used in the static deflection measurement of bridges and buildings. However, such instrumentation measures only local strain deformation at the point of strain sensor installation. In order to get a continuous range of strain measurements, an impractically large number of sensors is required. Furthermore, such sensors as presently known in the art are subject to significant long term drift, which in turn effects the accuracy of the resultant measurement.

Accordingly, it is an object of the present invention to provide an apparatus for measuring vertical displacement between a remote point and a reference point which is relatively accurate.

A further object is to provide an appartus for vertical displacment measurement which is operative where line-of-sight is obscured.

Still another object of the present invention is to provide a vertical displacement measurement apparatus which is relatively independent of temperature.

Still another object of the present invention is to provide a vertical displacement measuring apparatus which is relatively independent of pressure.

Yet another object of the present invention is to provide vertical displacement measurement apparatus which is relatively independent of variation in environmental parameters affecting fluid flow.

SUMMARY OF THE INVENTION

The present invention comprises a pair of liquid fluid reservoirs interconnected by hyraulic coupling means to a differential pressure transducer, and further includes a vapor pressure equalization means and a volumetric temperature compensation means. The transducer provides a signal representative of the hydrostatic pressure difference between pressure heads of the two reservoirs. In certain embodiments utilizing a single diaphragm, capacitor potentiometer transducer, there is substantially no fluid flow other than the relatively minor flow required to displace the transducer sensor diaphragm.

Each reservoir has an associated tube of a predetermined cross-sectional area for coupling liquid from the respective reservoir to an associated input port of the transducer. A pressure equalizer is provided to maintain equal vapor and gas pressure above the liquid surface in each reservoir. Since only the gravity-induced compression forces on the liquid in each reservoir are applied to the respective transducer input ports, each input pressure is proportional to the weight of liquid in the reservoir and the tube which lies above the level of the associated transducer input port.

For the particular geometry of a system according to the present invention, the system scale factor ensures that the differential pressure measured across the transducer is proportional to the difference in vertical displacement of the two remotely placed reservoirs. For example, for a system having identical reservoirs and identical cross-section coupling tubes which have only vertical and horizontal portions, the pressure from the liquid in a first reservoir is proportional to the height of the liquid surface measured from the associated input port of the transducer. The pressure from the liquid in the second reservoir is proportional with the same constant of proportionality to the height of the liquid surface in that reservoir as measured from the associated input port of the transducer. Consequently, the differential transducer output signal is proportional to the vertical displacement of the liquid surface in the first reservoir from that of the second reservoir.

The volumetric compensation of temperature provided by a system configured in accordance with the present invention is achieved by ensuring that any thermally introduced hydrostatic head applied to one transducer input port is matched by a substantially identical compensatory hydrostatic head applied to the other port. This compensation is achieved in one embodiment by providing that the length of the tubes feeding from the respective reservoirs to their associated input ports of the transducer are of equal length and further such that both such tubes are exposed to substantially the same temperature distribution. This configuration provides relatively high common mode rejection of thermally introduced hydrostatic heads.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 1 shows, in isometric form, vertical displacement measuring apparatus in accordance with the present invention; and FIGS. 2–5 show, in schematic form, alternative configurations of the present invention.

BRIEF DESCRIPTION OF THE PREFERRED EMBODIMENT

In the embodiment illustrated in FIG. 1, a reference reservoir 10 has its interior coupled to a first input port 12 of a differential pressure transducer 14 by way of tube 16a. A remote reservoir 20 has its interior region connected to a second input port 18 of transducer 14 by way of tube 22a. Tube 16a further includes an extension member 16b which extends from port 12 at points adjacent to tube 22a. Tube 22a has an extension member 22b which extends from port 18 at points adjacent to tube 16a. Each of reservoirs 10 and 20 contain a test liquid with top surface of the respective test liquid interfaces 26 and 28, shown by the dotted line in FIG. 1. The interior regions of reservoirs 10 and 20 are interconnected at points above interfaces 26 and 28 via vapor pressure equalization tube 30. The sensor input ports 12 and 18 of transducer 14 are at identical vertical heights. The vertical displacement of interface 26 from the sensor input port 12 is denoted by the symbol $h_1$ in FIG. 1 and the vertical displacement of interface 28 from input port 18 is indicated by the symbol $h_2$ in FIG. 1.

In the illustrated embodiments, it is assumed that close physical relationship of tubes 16a and 22b and tubes 16b and 22a ensure that the liquid in the interior regions of tubes 16a and 16b is subjected to a substantially identical temperature distribution as the liquid in the interior regions of tubes 22a and 22b. In some embodiments, this latter constraint may be established by enclosing tubes 16a and 16b and 22a and 22b in an enclosure whose interior region is maintained at a predetermined temperature, e.g. by convection using forced air passing through the enclosure.

In other embodiments, the temperature compensation extension tubes 16b and 22b may extend only along adjacent portions of respective tubes 22a and 16a for which temperature differential is expected. Furthermore, it will be understood that the transducer 14 may be integrally configured with reference reservoir 10 and thus, only a single temperature compensation extension tube is necessary in that embodiment.

In the vertically oriented column of liquid extending from reservoirs 10 and 20, only compressive forces act on the liquid. As a result, no shearing stress exists, and, therefore, the pressure at any point in the column is normal to all surfaces on which it acts, and is the same in all directions. Furthermore, the pressure is equal at all points in the same horizontal plane. Accordingly, the difference in static head pressure between two points at different levels is equal to the weight of the vertical column of the liquid of unit cross-sectional area, with its magnitude given by:

$$\Delta P_h = \int \frac{g}{g_c} \rho_T \, dh$$

where $h$ = vertical distance (inches), $g$ = local acceleration due to gravity (in/sec$^2$), $g_c$ = dimensional constant, (386.04 lb$_m$- in/lb$_f$- sec$^2$), $\Delta P_h$ = static head pressure (lb/in$^2$), and $\rho_T$ = density of the liquid at temperature T, (lb$_m$/in$^3$).

The density of a liquid may be further expressed in terms of its temperature dependency by the following equation:

$$\rho_T = \frac{\rho_o}{1 + C_e(T - T_o)}$$

where $C_o$ is the cubical expansion coefficient of the liquid at temperature $T_o$ (in$^3$/in$^3$/° F), $T_o$ = reference temperature (° F), $T$ = test temperature (° F), and $\rho_o$ = density of the liquid at temperature $T_o$ (lb$_m$/in$^3$).

An incompressible liquid is used in the system of FIG. 1. The reservoirs are identical (such that the surface tension effects are equal in both reservoirs) and the pressure above the liquid vapor interfaces is equalized via tube 30. Consequently, the pressure differential $\Delta P_I$ applied to the transducer 14 is equal to:

$$\Delta P_I = \int_{(1)}^{(2)} \frac{g}{g_c} \left[ \frac{\rho_o}{1 + C_e(T - T_o)} \right] dh - \int_{(3)}^{(4)} \frac{g}{g_c} \left[ \frac{\rho_o}{1 + C_e(T - T_o)} \right] dh$$

where the path from points 1 to 2 extends along the vertical portion of tube 16a and reservoir 10 to the interface 26, and the path from points 3 to point 4 extends along the vertical portion of tube 22a and into reservoir 20 to the interface 28. It is further assumed for the presently-described embodiment that the remainder of tubes 22a and 22b, and tubes 16a and 16b are substantially horizontal. Under isothermal (at $T_o$) conditions, the latter equation reduces to:

$$\Delta h = \frac{g_c}{g} \frac{\Delta P_I}{\rho o}$$

where $\Delta h$ = vertical displacement between two levels of liquid at remote locations (inches).

Of course, in other embodiments where non-identical reservoirs are utilized, appropriate scale factors may be utilized in the above equations to account for the effects of surface tension and non-compressibility of the liquid used.

In the embodiment of FIG. 1, the transducer 14 may be a differential pressure transducer configuration comprising a Model 572 transducer, Model 1056 electronics package and Model 525 thermal base, all manufactured by Datametrics Corporation, Wilmington, Mass. The sensor of this transducer is a capacitive potentiometer with the variable element being a highly pre-stressed metal diaphragm which is positioned between fixed capacitor plates, with the diaphragm establishing a separation between the two liquid columns provided by input ports 12 and 18. For this transducer, the liquid within the capacitor sensor regions must be a dielectric, for example, silicone fluid DC-200 manufactured by Dow Corning Corporation, Midland, Mich. The DC-200 silicone fluid is characterized by a viscosity equal to 1.5 centistokes.

In the present embodiment, the reservoirs 10 and 20 enclose identical cylindrical volumes with 2.0 inch heights and 5.0 inch diameters. The interconnecting tubing is made of ¼ inch inner diameter type F40-40 Tygon tubing, manufactured by Norton Company, Akron, Ohio.

Using this configuration, a resolution of 2 × 10$^{-5}$ percent of full vertical range (.0002 inches in 10 inch vertical range or 0.002 inches in 100 inch vertical range) may be attained between two remote stations located with horizontal separation on the order of 100 feet.

FIGS. 2–4 illustrate alternative embodiments for the present invention suitable for use with the Datametrics Model 572 transducer. In these figures, elements having corresponding elements in the embodiment of FIG. 1 are denoted with identical reference numerals. In the embodiment of FIG. 2, the pressure transducer 14 is integrally connected to the reference reservoir 10, and thus, there is no need for a temperature compensation tube similar to tube 22b in FIG. 1. In this embodiment also, the working fluid is a high dielectric liquid such as Dow Corning DC-200-1.5 C.S.

FIG. 3 shows an embodiment of the present invention suitable for use with a primary working fluid having a lower density-temperature dependency than Dow Corning DC-200-1.5 C.S., and which is still compatible with the Model 572 Datametrics differential pressure transducer.

The embodiment of FIG. 3 includes relatively low density-temperature dependent primary working fluids 27 and 29 (such as water) in the reservoirs 10 and 20, respectively, and includes high dielectric secondary working fluids 35 and 37 (such as DC-200-1.5 C.S.) directly in contact with the respective input ports 12 and 18 of differential pressure transducer 14. In this embodiment, the "zero" spring interface reservoirs 34 and 36 buffer the primary and secondary working fluids so that there is no restoring force associated with motion of the interface. It will be noted that the working fluids are relatively insoluble and possess substantially different densities.

Still another embodiment is illustrated in FIG. 4 utilizing a "zero" spring interface fluid. This latter embodiment is similar to that shown in FIG. 3, but has additional low vapor pressure liquids 42 and 44 disposed on primary fluid interfaces 26 and 28, respectively, of the reservoirs 10 and 20. In the illustrated embodiment, silicone fluid DC-200-2 C.S. serves as the low vapor pressure liquids 42 and 44. The use of the low vapor pressure liquid on the surface of the primary working fluids prevents significant mass transfer between the two reservoirs and correspondingly eliminates the dynamically changing pressure head of each reservoir which would otherwise result. Alternatively, the portions of the reservoirs above the interfaces 26 and 28 may be maintained at equal vapor pressures by other means known in the art.

Yet another alternative embodiment of the present invention is shown in FIG. 5, with elements corresponding to elements in the embodiment of FIG. 1 denoted with identical reference numerals. In this embodiment, reservoirs 10 and 20 are integrally connected and the interfaces 26 and 28 are at identical vertical heights. The remotely located pressure transducer 14 produces a signal representative of the vertical displacement of the interfaces 26 and 28. In this embodiment, the working fluids 27 and 29 for reservoirs 10 and 20 are characterized by differing densities, $\rho_1$ and $\rho_2$, respectively. The fluids 27 and 29 are further constrained to have substantially equal rates of change of density with respect to temperature. In this embodiment, the differential pressure $\Delta P_h$ applied across the transducer 14 may be expressed as:

$$\Delta P_h = \frac{g}{g_c} \left[ \int_{(1)}^{(2)} \rho_1 dh - \int_{(3)}^{(4)} \rho_2 dh \right]$$

Accordingly, the embodiment of FIG. 5 provides a vertical displacement measuring apparatus using liquids characterized by a difference in density and by substantially equal rates of change of density with respect to temperature. Exemplary fluids which may be used in this embodiment are silicone fluids DC-200-.65 C.S. and DC-200-20 C.S. Using these fluids in the configuration of FIG. 5, the temperature-induced error is on the order of 0.000014 inches/inch of head/° F. Of course, fluids having better matched density-temperature dependencies yield correspondingly more precise vertical displacement measurements. Measurement precision may also be improved at given temperatures by scale factor calibration obtained by initially displacing interfaces 26 and 28 over a predetermined vertical distance and then performing the desired measurement.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for measuring the vertical displacement between a remote point and a reference point, comprising:

A. a differential transducer having a two input port sensor and including means for generating a signal representative of the difference in pressure applied to the input ports of said sensor, B. a reference reservoir means and a remote reservoir means, each reservoir means having a liquid working fluid disposed therein, said working fluids each having a gas-liquid interface in its reservoir means and being disposed at points at and below said interface, C. a reference reservoir hydraulic coupling means for coupling one of said input ports with the interior region of said reference reservoir means at a point below its working fluid interface, D. a remote reservoir hydraulic coupling means for coupling the other of said input ports with the interior of said remote reservoir means at a point below its working fluid interface, E. vapor pressure equalization means including a pneumatic coupling means interconnecting the portion of the interior region of each of said reservoir means at a point above its respective working fluid interface to maintain substantially equal pressure in each of said portions, and F. volumetric temperature compensation means for offsetting temperature dependent changes in volume of said working fluids in said hydraulic coupling means.

2. Apparatus according to claim 1 wherein said vapor pressure equalization means further comprises a liquid disposed on the surface of said working fluids in each of said reservoir means, said liquid having a lower density than said working fluids and being relatively immiscible therewith, said liquid having relatively low vapor pressure.

3. Apparatus according to claim 1 wherein the remote and reference reservoir means are mechanically coupled so that said working fluid interfaces are substantially identical vertical distances from said transducer input ports, and wherein said working fluids are characterized by a different density, and wherein further the rate of change of density with respect to temperature for each of said working fluids is substantially equal.

4. Apparatus according to claim 3 wherein said vapor pressure equalization means further comprises a liquid disposed on the surface of said working fluids in each of said reservoir means, said liquid having a lower density than said working fluids and being relatively immiscible therewith, said liquid having relatively low vapor pressure.

5. Apparatus according to claim 1 wherein said volumetric temperature compensation means comprises:
   A. a first tube closed at one end and coupled at the other end to the interior region of a first of said reservoir means at a point below its working fluid interface, said first tube enclosing a volume of working fluid substantially identical to that enclosed by the hydraulic coupling means extending from the other reservoir means, and
   B. means to maintain the temperature of corresponding points in said volumes of working fluid substantially equal.

6. Apparatus according to claim 5 wherein said volumetric temperature compensation means further comprises:
   A. a second tube closed at one end and coupled at the other end to the interior region of said other reservoir means at a point below its working fluid interface, said second tube enclosing a volume of working fluid substantially equal to that enclosed by the hydraulic coupling means extending from said first reservoir means, and
   B. means to maintain the temperature of corresponding points in said volumes of working fluid substantially equal.

7. The apparatus according to claim 1 wherein said sensor includes a capacitive potentiometer sensing element with a pre-stressed metal diaphragm positioned between fixed capacitor plates, said diaphragm separating the working fluids applied by said input ports, and wherein said working fluids are characterized by a relatively high dielectric constant.

8. Apparatus according to claim 7 wherein each of said remote and reference reservoir hydraulic coupling means further comprises an associated two port interface reservoir means having a first port hydraulically coupled to said associated reservoir by said working fluid, and a second port hydraulically coupled to said associated transducer input port by a sensor liquid, said sensor liquid being characterized by a high dielectric constant relative to that of the associated working fluid, and a different density than and being immiscible with the associated working fluid, said interface reservoir having a sensor liquid-working fluid interface therein, whereby pressure applied by said working fluid from said associated reservoir means is transferred to said associated transducer input port by said sensor liquid.

9. Apparatus according to claim 8 wherein said vapor pressure equalization means further comprises a liquid disposed on the surface of said working fluids in each of said reservoir means, said liquid having a lower density than said working fluids and being relatively immiscible therewith, said liquid having relatively low vapor pressure.

* * * * *